(12) United States Patent
Morris et al.

(10) Patent No.: US 8,073,581 B2
(45) Date of Patent: Dec. 6, 2011

(54) EFFICIENT DATA ACQUISITION FOR TRACK DATABASES

(75) Inventors: Charles W. Morris, Manassas, VA (US); Matthew A. Rhodes, Arlington, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 526 days.

(21) Appl. No.: 12/276,198

(22) Filed: Nov. 21, 2008

(65) Prior Publication Data

US 2010/0131185 A1    May 27, 2010

(51) Int. Cl.
*G05D 1/00* (2006.01)

(52) U.S. Cl. ..... 701/19; 701/208; 235/440; 235/462.17; 235/462.32; 246/122 R; 340/10.52; 340/10.42; 340/572.1

(58) Field of Classification Search ............... 701/19, 701/20, 200, 207, 208, 213; 235/439, 384, 235/440, 462.1, 462.11, 462.13, 462.17, 235/462.31, 462.32, 470, 474, 494; 246/122 R, 246/123, 124; 340/10.1, 10.2, 10.52, 10.42, 340/572.1, 572.4, 988, 989
See application file for complete search history.

(56) References Cited

U.S. PATENT DOCUMENTS 6,799,097 B2 *   9/2004   Villarreal Antelo et al. ... 701/19
2006/0009905 A1 * 1/2006   Soderberg et al. ............ 701/200

FOREIGN PATENT DOCUMENTS

GB              2 204 434      * 11/1988

* cited by examiner

*Primary Examiner* — Mark Le
(74) *Attorney, Agent, or Firm* — DeMont & Breyer, LLC (57) ABSTRACT

An improved method of rail survey deploys feature identification tags along an inner edge of a train track rail. Each tag includes a unique identifier to identify a respective feature along the train track. Each tag includes a reflector to reflect light to a sensor on a track surveyor. The sensor reads track feature tags without the need for stopping at each feature. A track database is provided that is capable of storing tables that associate track features with geo-locations. As each tag is deployed or read during a rail survey, it can be paired with geo-location data and stored in the track database.

19 Claims, 6 Drawing Sheets

EFFICIENT DATA ACQUISITION FOR TRACK DATABASES

FIELD OF THE INVENTION

The present invention relates to data acquisition in general, and, more particularly, to a method of surveying a train track.

BACKGROUND OF THE INVENTION

In many instances it would be desirable to have a database that describes the geometry of a train track centerline (e.g., grade, curvature, direction, location, etc.), as well as the geo-locations of various features (e.g., grade crossings, mileposts, signals, platforms, switches, spurs, etc.) along the train track. For example, such a database would be useful in train motion, along track position, and path-taken navigation algorithms, predictive braking algorithms, and locomotive fuel management algorithms. Consequently, it would also be desirable to have an efficient method of obtaining the data for such databases.

SUMMARY OF THE INVENTION

Rail surveys are expensive and time-consuming undertakings that can tie up railways for substantial periods of time. Rail surveys can require many stops and starts on the track to positively identify and generate coordinate data for rail track features, impacting traffic flows and schedules. On busy routes, this can result in allocating survey windows in small increments, making the process inefficient. The present invention provides a method of conducting rail surveys that can mitigate some of these difficulties, while providing very robust feature location to feature type association processes.

In particular, the illustrative embodiment employs feature identification tags that are affixed to the inner edge of a train track base flange at respective features along the track (e.g., mileposts, traffic signals, switches, etc.). In accordance with the illustrative embodiment, each tag has a unique identifier that, if desired, can be representative of a geographic information system (GIS) database feature reference number. The tag comprises an optical bar code that contains the identifier, as well as an optical reflector that can be detected by an optical sensor on a track survey vehicle. Advantageously, the reflector can be detected without stopping, thus enabling a rail survey to be conducted more quickly than techniques that require stopping to precisely locate and identify each feature.

The illustrative embodiment employs a track database that is capable of storing tables that associate specific track features with geo-locations. As each tag is pre-deployed and later detected and read during the rail surveying process, it can be paired with geo-location data stored on the track database or obtained from a Global Positioning System (GPS) based tracking system on the survey vehicle. Both the feature information and the geo-location can be stored in the track database.

The illustrative embodiment comprises: reading, while moving along a train track, an identifier from a tag that is attached to a rail of the train track near a feature of the train track; sensing, while moving along the train track, a reflection from the tag; and recording (i) an indicium of the identifier, and (ii) an indicium of a geo-location that is reported at the time that the reflection is sensed.

DETAILED DESCRIPTION

Figure 1:
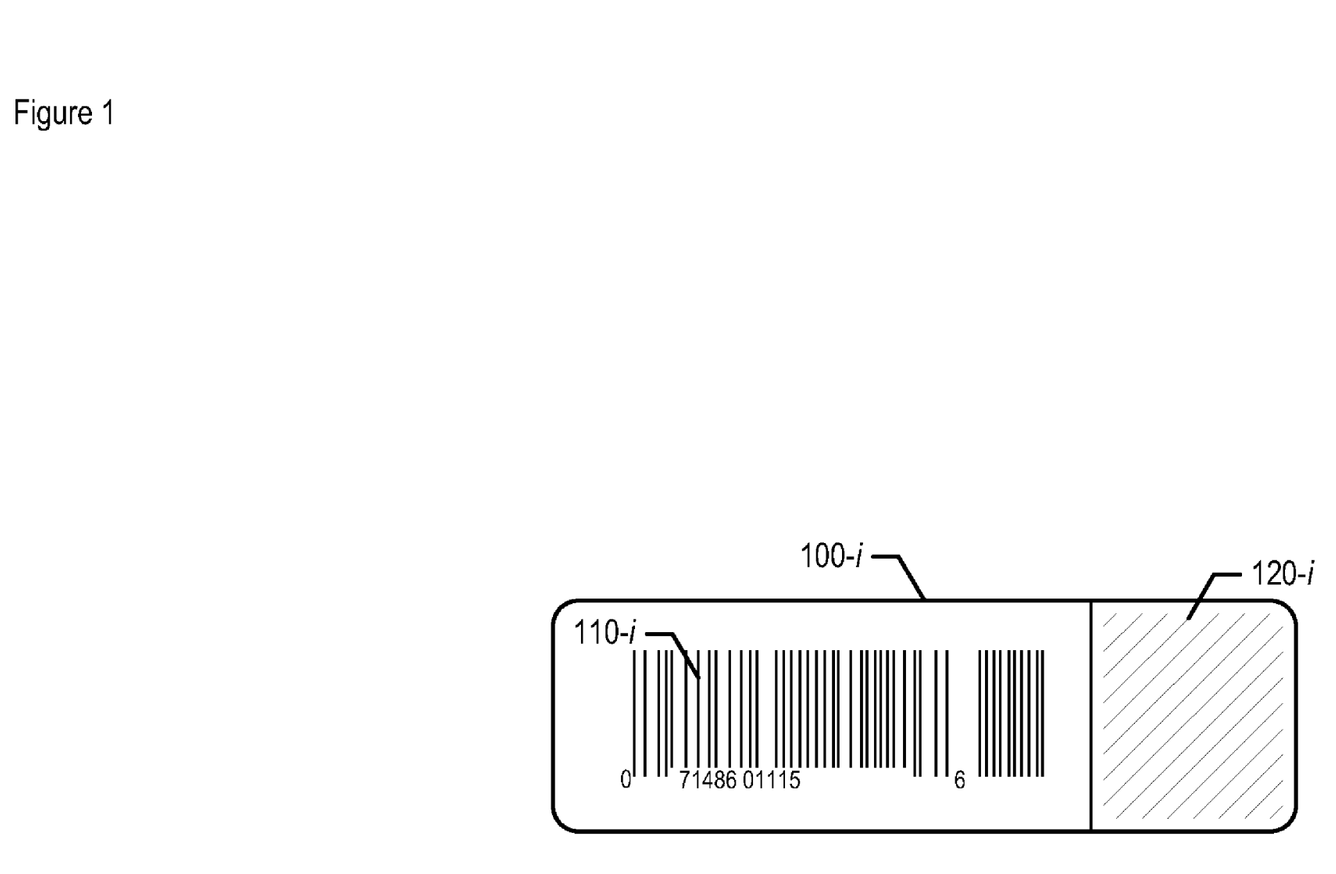
FIG. 1 depicts tag 100-$i$ that is to be attached to a train track rail, where i is a positive integer, in accordance with the illustrative embodiment of the present invention.

FIG. 1 depicts tag 100-$i$ that is to be attached to a train track rail, where i is a positive integer, in accordance with the illustrative embodiment of the present invention. As shown in FIG. 1, tag 100-$i$ comprises a unique identifier 110-$i$ for a given respective feature and a reflector 120.

Unique identifier 110 is utilized to identify a respective feature along the train track such as a milepost, a traffic signal, a switch, and so forth. In accordance with the illustrative embodiment, unique identifier 110-$i$ is an optical bar code disposed on tag 100-$i$ that, if desired, might be representative of a geographic information system (GIS) database feature reference number. Alternatively, in some other embodiments of the present invention, unique identifier 110-$i$ might include an active or passive radio-frequency identification (RFID) tag, or some other means for identification, so long as unique identifier 110-$i$ is readable by a sensor of the track surveyor.

In accordance with the illustrative embodiment, unique identifier 110-$i$ can be scanned by an optical sensor of the track surveyor and paired with the geo-location of the feature it represents, such as, for example, the longitude, latitude, and altitude observed and recorded at the location of the feature.

Scanning of unique identifier 110-$i$ can occur by a pedestrian, an on-track rail-borne surveyor such as a moving high-rail vehicle, or by aerial means, each having a sensor to scan the unique identifier 110-$i$.

Reflector 120-$i$ is applied to tag 100-$i$ and is configured to reflect light to a sensor. In accordance with the illustrative embodiment, reflected light is received by an optical sensor of a track surveyor and is captured as a voltage pulse, thereby identifying the precise instant that a tag 100-$i$ has been passed over by the optical sensor. As will be appreciated by those skilled in the art, in some embodiments reflector 120-$i$ might be reflective tape applied to tag 100-$i$, while in some other embodiments, reflector 120-$i$ might be some other material that is affixed to tag 100-$i$. In any case, it will be clear to those skilled in the art, after reading this disclosure, how to make and use reflector 120-$i$ and apply reflector 120-$i$ to tag 100-$i$.

In accordance with the illustrative embodiment, tag 100-$i$ is a long, rectangular metal strip upon which unique identifier 110-$i$ and reflector 120-$i$ are disposed, and which is permanently affixed with epoxy bonding along an inner edge of a train track rail base flange.

Figure 2:
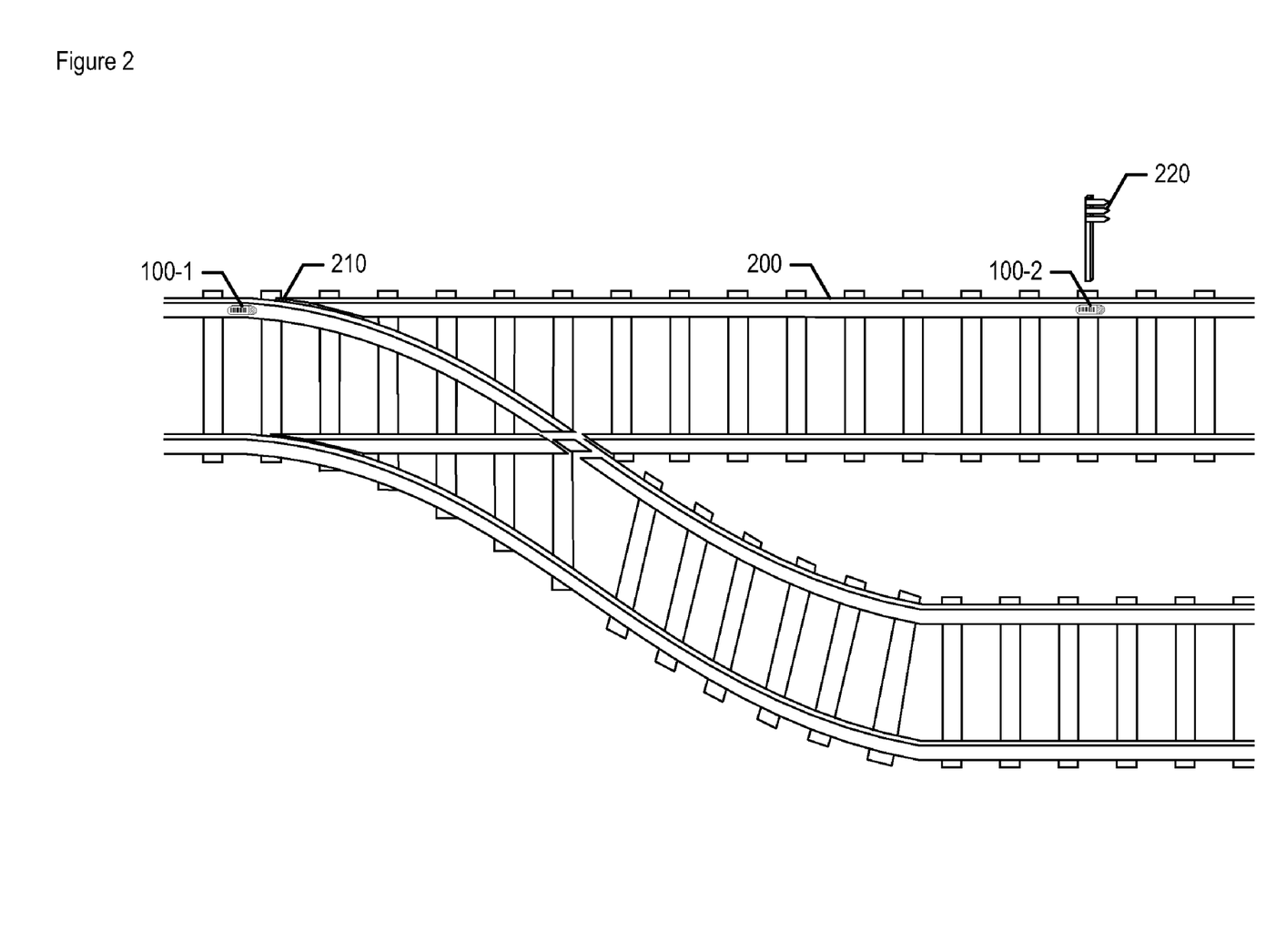
FIG. 2 depicts train track 200 with tags 100-1 and 100-2 attached to the inside of one of the track's rails, in accordance with the illustrative embodiment of the present invention.

FIG. 2 depicts train track 200 with tags 100-1 and 100-2 attached to the inside of one of the track's rails, in accordance with the illustrative embodiment of the present invention. As shown in FIG. 2, tag 100-1 can be deployed upon an inner edge of a train track rail base flange at switch 210. After deployment and once tag 100-1 is scanned or otherwise read, the switch 210 feature of the train track rail can be identified, recorded, and paired with geo-location information.

Tag 100-2 is deployed upon an inner edge of a train track rail base flange at milepost marker 220. After deployment and once tag 100-2 is scanned or otherwise, the milepost marker 220 feature of the train track rail can be identified, recorded, and paired with geo-location information.

In addition to the switch 210 and milepost marker 220 depicted, other features to be tagged can include, but are not limited to rail crossings, speed limits, switch points, switch clearance points, high way at grade crossings, quiet zones, points of interest, derails, hot box detectors, track circuits, etc.

Figure 3:
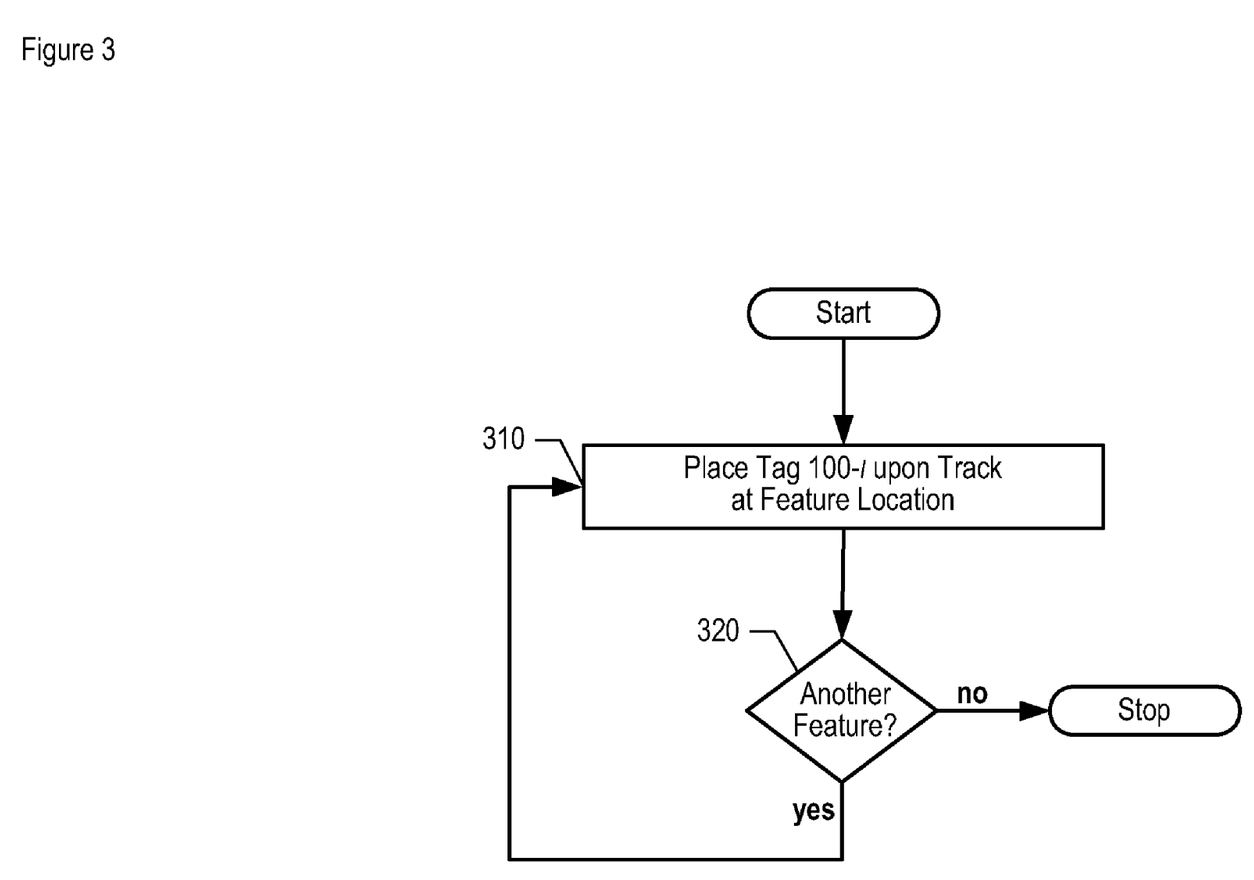
FIG. 3 depicts a method for deploying tags 100-1 through 100-N at features of train track 200, where N is a positive integer, in accordance with the illustrative embodiment of the present invention.

FIG. 3 depicts a method for deploying tags 100-1 through 100-N at features of train track 200, where N is a positive integer, in accordance with the illustrative embodiment of the present invention. It will be clear to those skilled in the art, after reading this disclosure, which tasks depicted in FIG. 3 can be performed simultaneously or in a different order than that depicted.

At task 310, tag 100-i is deployed and placed upon track 200 by an operator at a given feature location, such as at switch 210 or milepost marker 220 of FIG. 2, where i is an integer between 1 and N inclusive. In accordance with the illustrative embodiment, tag 100-1 is permanently affixed with epoxy bonding along an inner edge of a train track rail base flange at the location of the feature. As will be appreciated by those skilled in the art, some other embodiments of the present invention might attach tag 100-i to the train track in an alternative manner, and it will be clear to those skilled in the art, after reading this disclosure, how to perform task 310 in accordance with such embodiments.

Task 320 checks whether there is another feature that is to be recognized with a tag. If so, step 310 is repeated, otherwise the method of FIG. 3 terminates. Step 310 is thus repeated for tags 100-1 through 100-N until all features along the track segment being surveyed have been recognized and a tag has been deployed at each feature.

Figure 4:
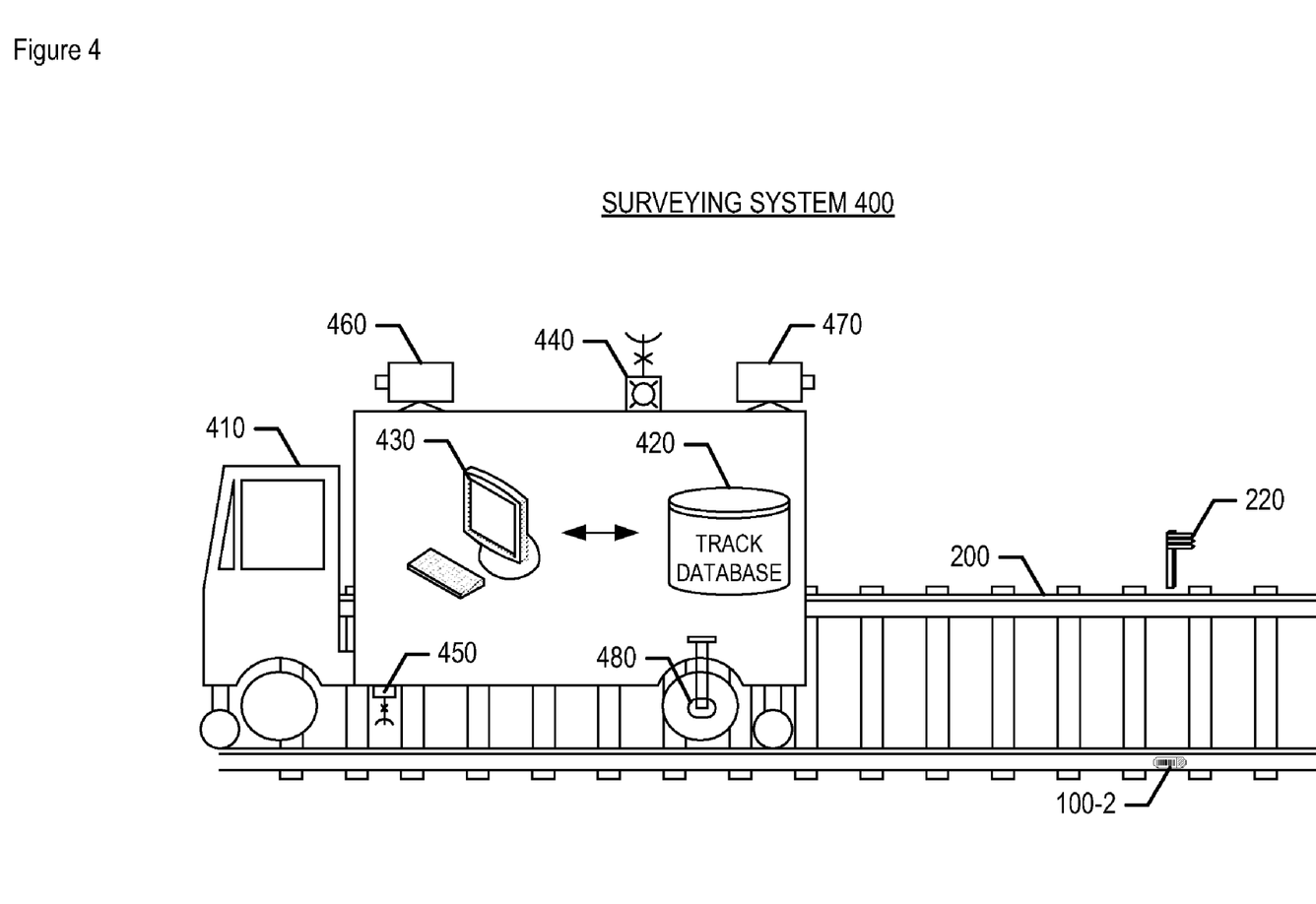
FIG. 4 depicts system 400 for surveying train track 200, in accordance with the illustrative embodiment of the present invention.

FIG. 4 depicts system 400 for surveying train track 200, in accordance with the illustrative embodiment of the present invention. In accordance with the illustrative embodiment, system 400 is capable of performing the tasks described below and with respect to FIG. 6.

As shown in FIG. 4, system 400 comprises survey vehicle 410. Survey vehicle 410 is, for example, a high-rail vehicle, such as a truck, with rail wheel sets disposed on each end to suspend the vehicle on track rails. Survey vehicle 410 is radio enabled for communication with crews, trains, and dispatchers. Survey vehicle 410 enters track 200 at a grade crossing.

System 400 also comprises track database 420. In accordance with the illustrative embodiment, track database 420 is a relational database that is capable of storing tables that associate track features with geo-locations. As will be appreciated by those skilled in the art, although the illustrative embodiment employs a relational database for track database 420, some other embodiments of the present invention might employ some other type of data store for storing this information (e.g., an object-oriented database, one or more unstructured files, one or more data structures stored in main memory, etc.), and it will be clear to those skilled in the art, after reading this disclosure, how to make and use such alternative embodiments.

System 400 also comprises computer 430 having a processor and configured to operate software. Computer 430 can be, for example, an on-board personal computer located on the survey vehicle 430 with electronic access to track database 420. As will be appreciated by those skilled in the art, in some embodiments, the computer 430 can be a personal-data-assistant (PDA), remote computer, or the like, with access to the database 420 and accessible by an operator.

System 400 further comprises global positioning satellite (GPS) receiver 440. GPS receiver 440 is utilized to provide precise geo-locations, such as longitude, latitude, and altitude, as well as a precise time, to computer 430 while vehicle 410 is proceeding along track 200.

System 400 also comprises sensor 450. Sensor 450 is configured to detect and read tags 100-1 through 100-i as vehicle 410 proceeds along track 200. In accordance with the illustrative embodiment, sensor 450 is an optical sensor. As light is reflected to the passing sensor 450 from reflector 120, tag 100-i is detected. Once detected, the unique identifier 110 on the tag 100-i is read and recorded in track database 420. As will be appreciated by those skilled in the art, in some other embodiments of the present invention sensor 450 might detect tags in some other manner (e.g., radio frequency, etc.), and it will be clear to those skilled in the art, after reading this disclosure, how to make and use sensor 450 in such alternative embodiments.

System 400 further comprises forward-facing camera 460 to gather video data as vehicle 410 approaches a feature. In accordance with the illustrative embodiment, camera 460 is a high resolution camera having a fish-eye lens that is operator-activated to review oncoming features as needed upon approach.

System 400 also comprises rearward-facing camera 470 to gather video data as vehicle 410 passes a tagged feature. In accordance with the illustrative embodiment, camera 470 is a high resolution camera having a fish-eye lens. Camera 470 captures a video image of a tagged feature based upon a predetermined distance past the tagged feature taking into consideration the vehicle 410 speed and the time elapsed since the last tag 100-i detected and read by sensor 450.

Utilization of cameras 460 and 470 can enable non-stop rail survey by vehicle 410 along track 200. Additionally, rail survey post-processing can be completed without the need for direct operator input for cross-referencing data since cameras 460 and 470 have captured approach and departure video data.

System 400 further comprises wheel hub lock and wheel rate sensor 480. High rail wheel slip is detrimental to accurate rail surveying. To prevent high rail wheel slip, wheel hub lock and wheel rate sensor 480 are utilized to lock a rear wheel hub of vehicle 410 when mounting the vehicle to the rail. Once the vehicle 410 is mounted to the track 200, the wheel hub lock is unlocked so that inadvertent vehicle accelerations from an operator do not result in wheel rate sensor 480 from falsely sensing vehicle motion due to wheel slip. Use of the wheel hub lock and wheel rate sensor 480 can enable the vehicle 410 to proceed at a higher average speed, and thus consume much less time during a rail survey.

In operation system 400 can be utilized as follows: as vehicle 410 proceeds along track 200, a tag, such as 100-2 denoting milepost marker 220, is detected by sensor 450. At the point of detection, the feature identification description for tag 100-2 is paired with the precise geo-location data, such as longitude, latitude, and altitude, as obtained by GPS receiver 440, and stored in, and/or compared with pre-existing data in, track database 420. Forward-facing camera 460 can be operator-initiated upon approach to tag 100-2 to view the feature and to capture video as needed. Rearward-facing camera 470 can capture a video image of the feature, milepost marker 220, based upon a predetermined distance past the feature taking into consideration the vehicle 410 speed and the time elapsed since the tag 100-2 was sensed by sensor 450. Computer 430 can manage track database 420 with receipt of data from sensor 450, GPS receiver 440, forward-facing camera 460, and rearward-facing camera 470.

Figure 5:
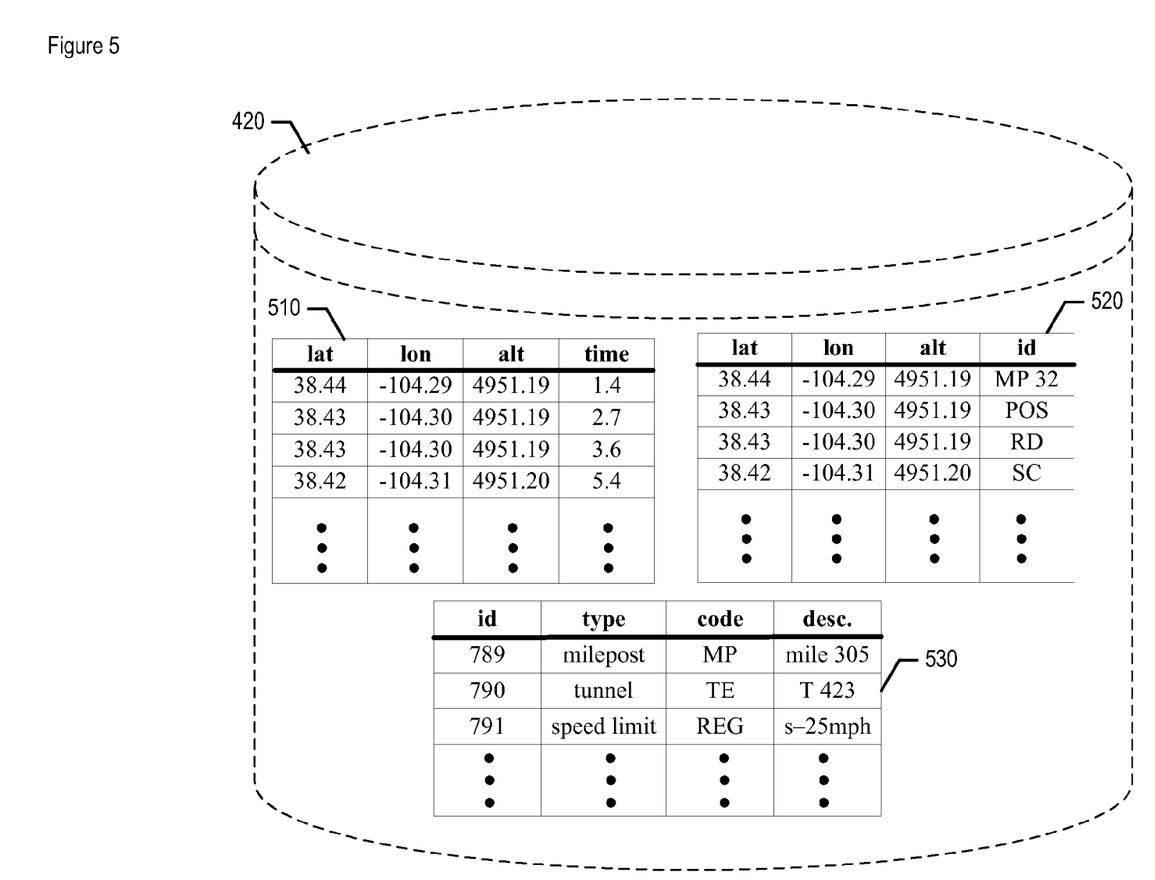
FIG. 5 depicts illustrative contents of database 420, as shown in FIG. 4, in accordance with the illustrative embodiment of the present invention.

FIG. 5 depicts illustrative contents of database 420, as shown in FIG. 4, in accordance with the illustrative embodiment of the present invention. Track database 420 is a relational database that is capable of storing tables that associate track features with geo-locations.

As shown in FIG. 5, database 420 comprises track table 510. Track table 510 includes geo-location information with geographic coordinates representative of longitude, latitude, and altitude, such as coordinates obtained from GPS receiver based locating system 440, for example, during the rail survey. These data can represent the track centerline, as well as aforementioned track features. Utilizing differential GPS correction information can provide consistent sub-meter track centerline accuracy of the train track in rail surveys. Time of survey for each feature and centerline point is also recorded.

By way of example, a track data point in track table 510 referencing a specific track centerline location might include a longitude coordinate of 38.44480638 degrees, a latitude coordinate of −104.2945505 degrees, and an altitude coordinate of 4951.1957 feet. Track table 510 can also include a distance field, measuring a distance along the track from predetermined point.

Database 420 also comprises geo-location feature table 520 that includes geo-locations associated with an identification of the feature located at that point. In addition to the geo-location coordinates of table 510, geo-location feature table 520 includes a feature identification. By way of example, MP is a milepost, POS is a point of switch, RD is an at grade road crossing, and SL is a speed limit, all features which can be noted along the track railway along with their respective longitude, latitude, and altitude.

Database 420 further comprises a feature table 530 without the geo-location information. Situations can occur when no track table 510 having geo-location information or track features for the rail line are available. A feature table 530 can store information input from an operator making selections from a graphical user interface (GUI) and selecting options from various drop-down choices and prompts.

In accordance with the illustrative embodiment, during a rail survey an operator can select a feature ID corresponding to a category and type of feature, such as a milepost marker, a tunnel, or a speed change, for example. The feature can be classified by a category and a code and can include a free-form written description entered by the operator to describe the feature.

Categories can include, for example, but not limited to, track allotment such as a subdivision boundary, regulatory such as the beginning of a quiet zone, physical objects such as a hot box defect detector, crossings such as a controlled crossing centerline, switch points, signal masts, and control points such as a power switch, stations such as a train yard limit, and miscellaneous such as a milepost marker.

As will be appreciated by those skilled in the art, although the illustrative embodiment employs these tables 510, 520, 530, some other embodiments of the present invention might employ some other data tables and data fields to record rail survey track data and feature attributes.

Figure 6:
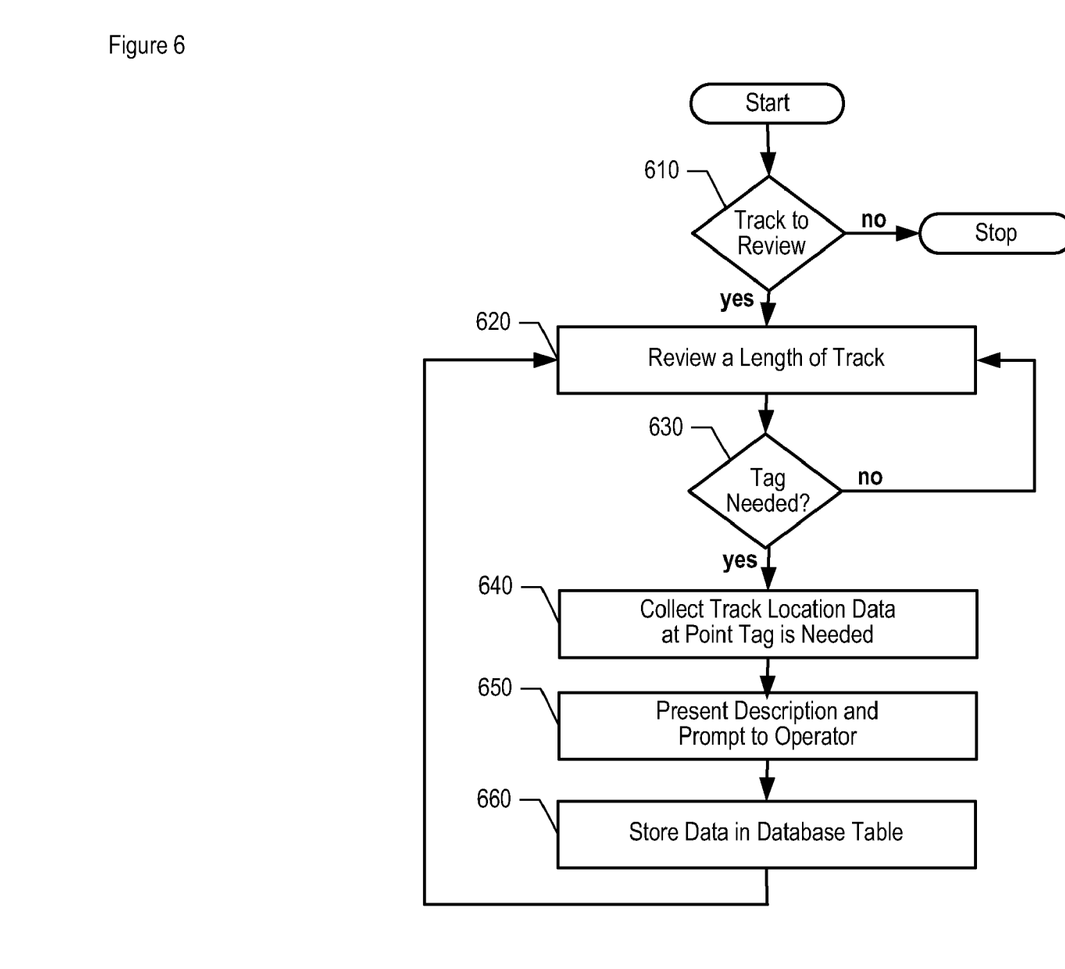
FIG. 6 depicts a method of surveying train track 200, in accordance with the illustrative embodiment of the present invention.

FIG. 6 depicts a method of surveying train track 200, in accordance with the illustrative embodiment of the present invention. It will be clear to those skilled in the art, after reading this disclosure, which tasks depicted in FIG. 6 can be performed simultaneously or in a different order than that depicted.

Task 610 inquires whether there is an additional segment of track to review as part of the rail survey.

Task 620 reviews a given length of track for features along the track that need to be identified, recorded, and paired with geo-location information when it is available.

Task 630 inquires whether a tag is needed to mark a given feature. If a tag is not needed, and there are no other features to be tagged in that given length of track, procession is made to task 620 to review the next length of track.

If a tag is needed to denote a feature at a specific track location, task 640 collects track geo-location data at the point along the track where the feature is located and the tag is to be placed such that longitude, latitude, and altitude, for example, are collected and stored with the feature description.

If a tag is needed to denote a feature at a specific track location, task 650 prompts the operator with a series of choices regarding feature class, feature description, etc. with which to populate a database table in the track database.

Data gathered from collection of track location data in step 640 and the operator responses entered in step 650 are stored in a database table.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
reading, with a first sensor from a vehicle moving along a train track, an identifier from a tag that is attached to a rail of the train track near a feature along the train track;
sensing, with a second sensor while moving along the train track, a reflection from an optical reflector on the tag, wherein the optical reflector is physically distinct from the identifier; and
recording
(i) an indicium of the identifier, and
(ii) an indicium of a geo-location that is reported at the time that the reflection is sensed.

2. The method of claim 1 further comprising retrieving a description of the feature from a data store that associates identifiers with features of the train track.

3. The method of claim 2 further comprising presenting at a user interface the description and a prompt for a user to confirm the description.

4. The method of claim 1 wherein the tag comprises an optical bar code that encodes the identifier.

5. The method of claim 1 wherein the tag comprises an optical reflector, and wherein the reflection is from the optical reflector.

6. The method of claim 1 further comprising recording an indicium of another geo-location that is on the train track but is not situated near the feature.

7. The method of claim 1 wherein the feature is one of a grade crossing and a milepost.

8. A method comprising:
attaching to a rail of a train track, at each of a plurality of features along the train track, a respective tag;
reading, with a first sensor from a vehicle moving along the train track, identifiers from the respective tags;
sensing, with a second sensor while moving along the train track, reflections from optical reflectors on the respective tags; and
recording associations between
(i) indicia of the identifiers, and
(ii) indicia of geo-locations that are reported when the reflections are sensed.

9. The method of claim 8 wherein the attaching of the respective tags is performed without being on the train track.

10. The method of claim 8 further comprising retrieving descriptions of one or more of the features from a data store that associates identifiers with features of the train track.

11. The method of claim 10 further comprising presenting at a user interface the descriptions and one or more prompts for a user to confirm the descriptions.

12. The method of claim 8 wherein at least one of the respective tags comprises an optical bar code.

13. The method of claim 8 further comprising recording an indicium of another geo-location that is on the train track but is not situated near any of the features.

14. The method of claim 8 wherein at least one of the features is a traffic signal.

15. A method comprising;
attaching a tag to a rail of a train track near a feature along the train track, wherein the tag comprises an optical bar code and an optical reflector that is physically distinct from the optical bar code, and wherein the optical bar code encodes an indicium of the feature;
reading the optical bar code by a first sensor moving along the train track; and
sensing light from the optical reflector by a second sensor moving along the train track.

16. The method of claim 15 wherein the attaching of the tag is performed without being on the train track.

17. The method of claim 15 wherein the indicium of the feature is a key of a table in a database that stores information about features along the train track.

18. The method of claim 15 wherein the feature is a switch.

19. The method of claim 15 wherein the feature is a spur.

* * * * *